C. H. HAESELER.
PORTABLE ENGINE.
APPLICATION FILED NOV. 14, 1912.

1,096,239.

Patented May 12, 1914.
5 SHEETS—SHEET 1.

WITNESSES:

INVENTOR
Charles H. Haeseler,
BY
Charles N. Butler
ATTORNEY.

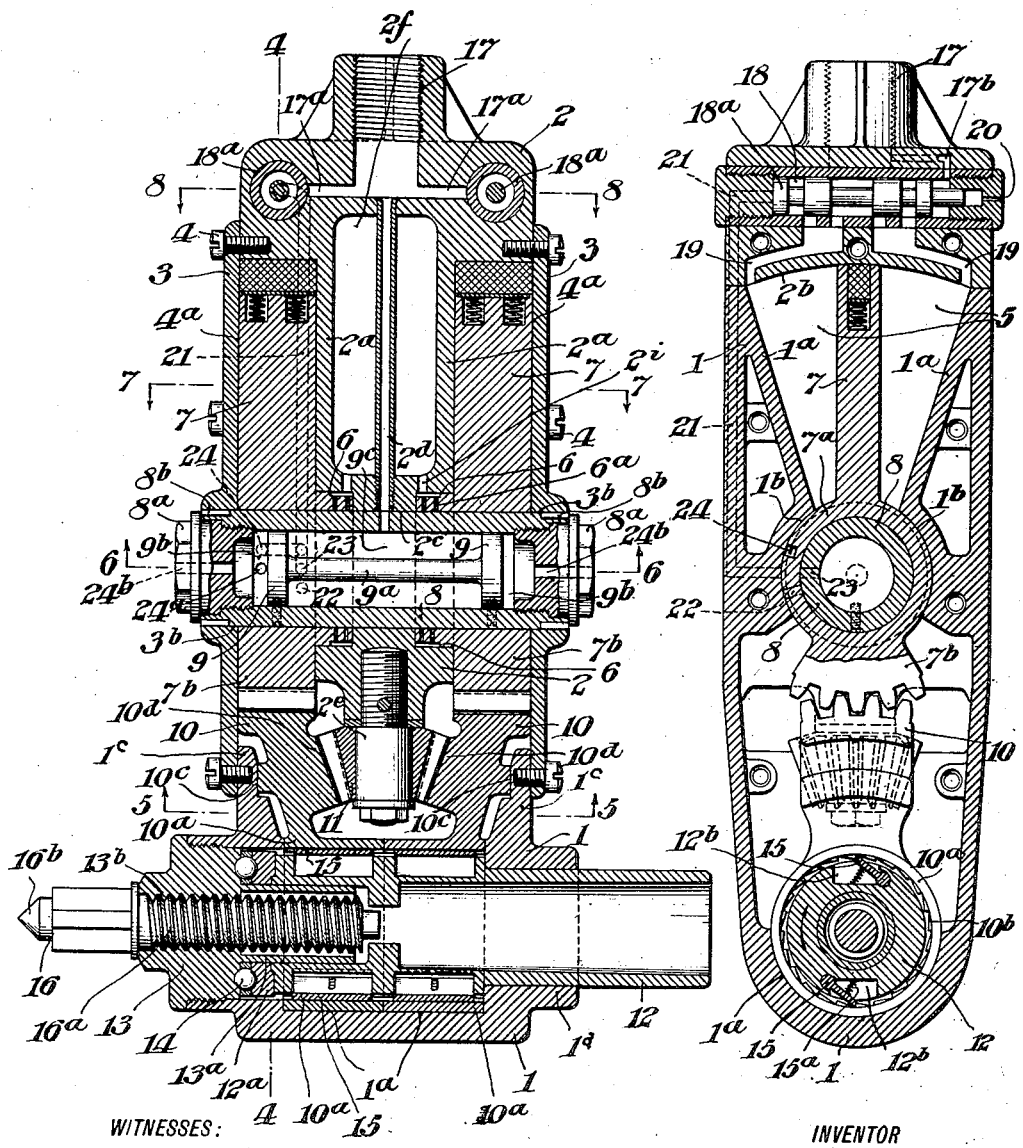

C. H. HAESELER.
PORTABLE ENGINE.
APPLICATION FILED NOV. 14, 1912.

1,096,239.

Patented May 12, 1914.
5 SHEETS—SHEET 3.

WITNESSES:

INVENTOR
Charles H. Haeseler,
BY
Charles N. Butler
ATTORNEY.

C. H. HAESELER.
PORTABLE ENGINE.
APPLICATION FILED NOV. 14, 1912.
1,096,239.
Patented May 12, 1914.
5 SHEETS—SHEET 4.
Fig. 10.
Fig. 11.
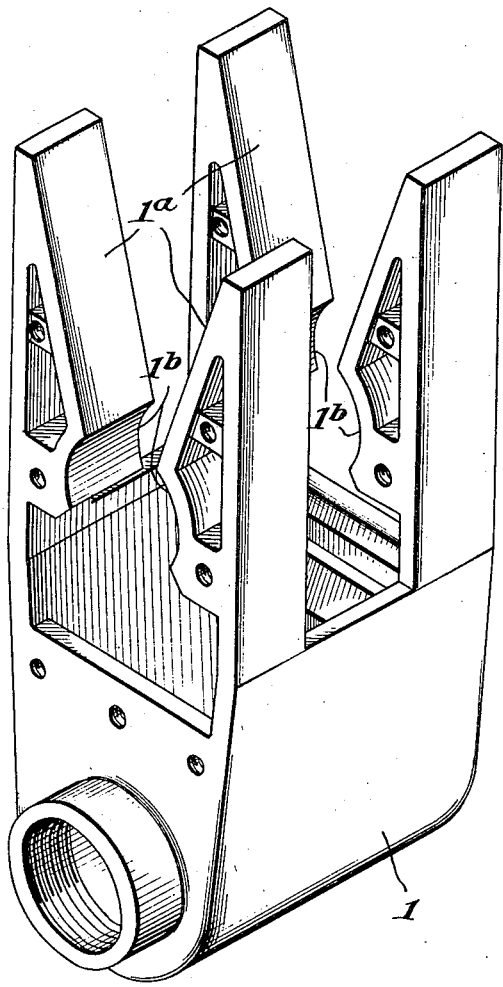
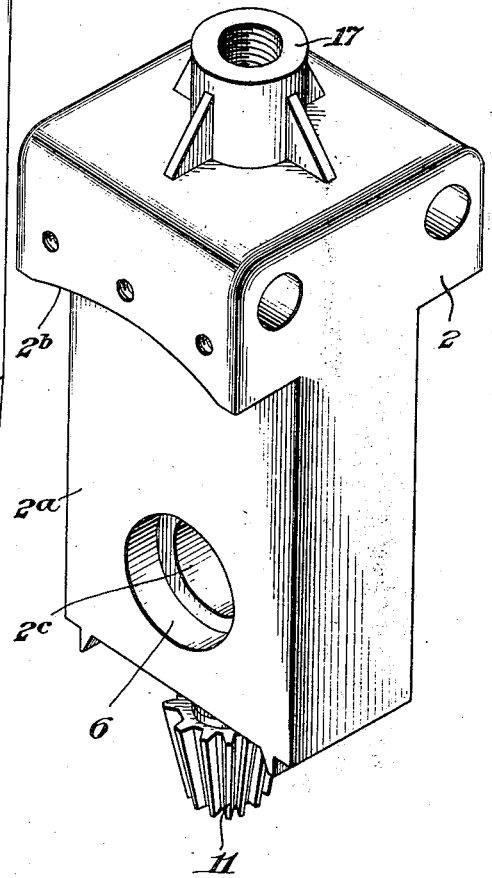
WITNESSES:
INVENTOR
Charles H. Haeseler,
BY
Charles N. Butler
ATTORNEY.

C. H. HAESELER.
PORTABLE ENGINE.
APPLICATION FILED NOV. 14, 1912.

1,096,239.

Patented May 12, 1914.

5 SHEETS—SHEET 5.

WITNESSES:
Jos. J. Denny
Geo. A. Dunney

INVENTOR
Charles H. Haeseler;
BY
Charles N. Butler
ATTORNEY.

UNITED STATES PATENT OFFICE.

CHARLES H. HAESELER, OF PHILADELPHIA, PENNSYLVANIA.

PORTABLE ENGINE.

1,096,239.   Specification of Letters Patent.   Patented May 12, 1914.

Application filed November 14, 1912. Serial No. 731,411.

*To all whom it may concern:*

Be it known that I, CHARLES H. HAESELER, a citizen of the United States, residing in the city of Philadelphia, county of Philadelphia, and State of Pennsylvania, have invented certain Improvements in Portable Engines, of which the following is a specification.

My invention relates to mechanism adapted to be operated by an elastic fluid for effecting rotary motion, particularly the rotation of a tool such as a metal cutting drill. Its leading objects are to provide a high speed machine of small outside dimensions capable of use in corners and contracted spaces, as in the construction of steel ships, buildings, boilers, engines and other heavy metal work, and to secure a strong and simple construction, of parts comparatively few in number, readily manufactured and assembled, and related so that friction, wear and leakage shall be reduced to a minimum.

In portable fluid operated machines heretofore used for drilling metal, the power has commonly been transmitted to the tool spindle by means involving the use of complicated and numerous parts, such as several reciprocating power pistons, crank shafts, numerous gears, sliding eccentric blocks and other elements, certain of which are necessarily of light construction, subject to excessive friction and wear, and liable to derangement and breakage, entailing delays and expenses, which are increased by the complicated character of the constructions and the difficultly accessible parts. The foregoing characteristics of the machines heretofore used are further objectionable by reason of the ignorance, negligence and abuse of the unskilled labor usually employed to operate them. My invention is designed to eliminate objectionable characteristics incidental to such machines of the prior art.

Figure 1:
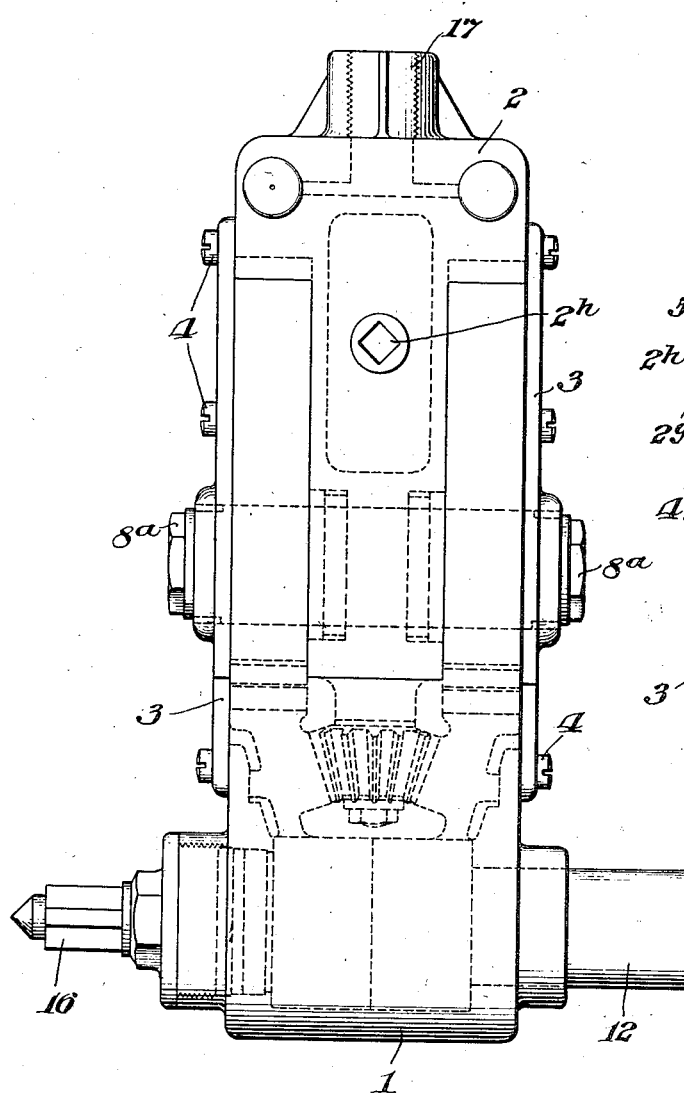
Figure 2:
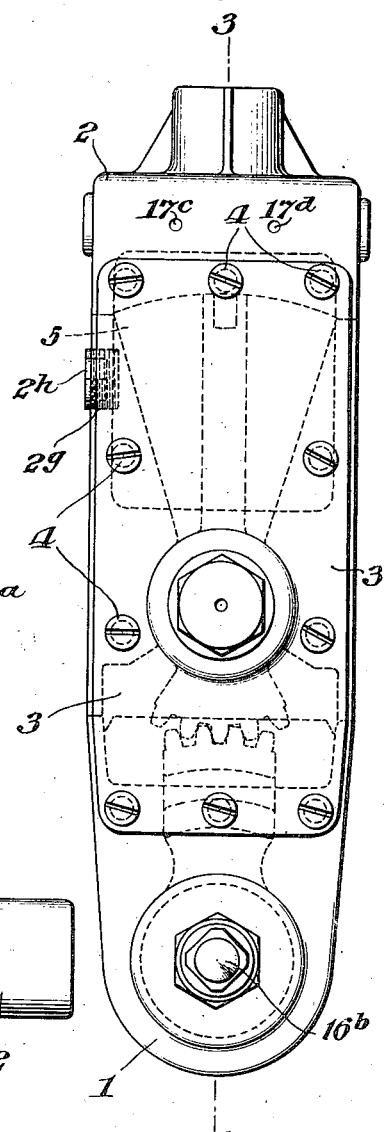
Figure 5:
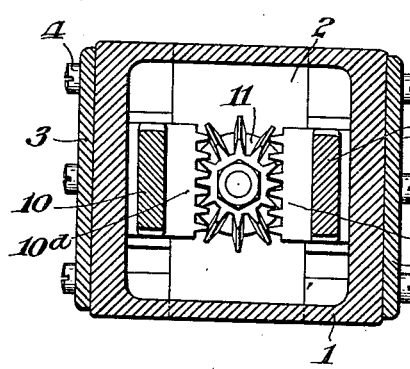
Figure 6:
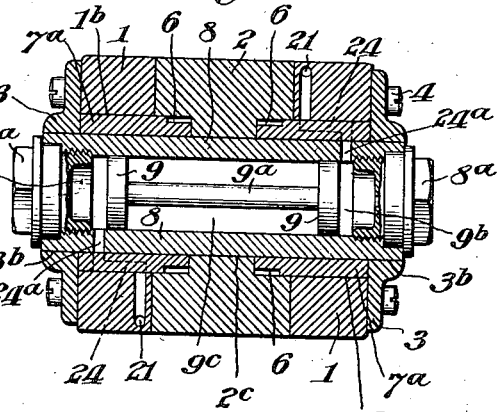
Figure 7:
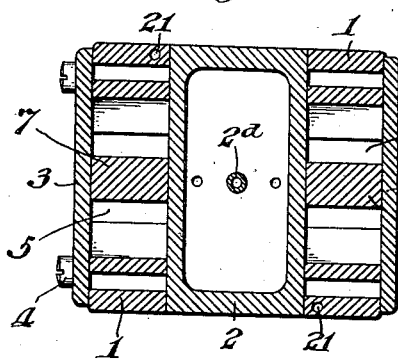
Figure 8:
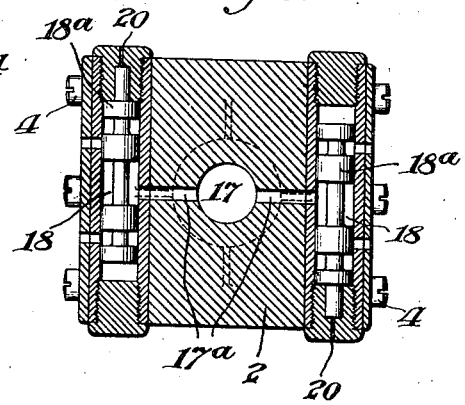
Figure 9:
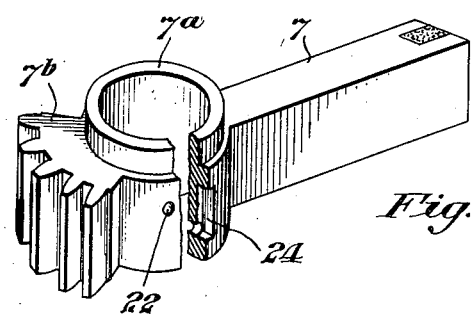
Figure 12:
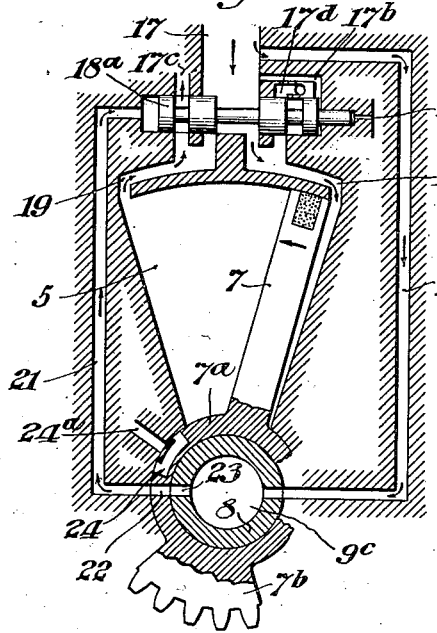
Figure 13:
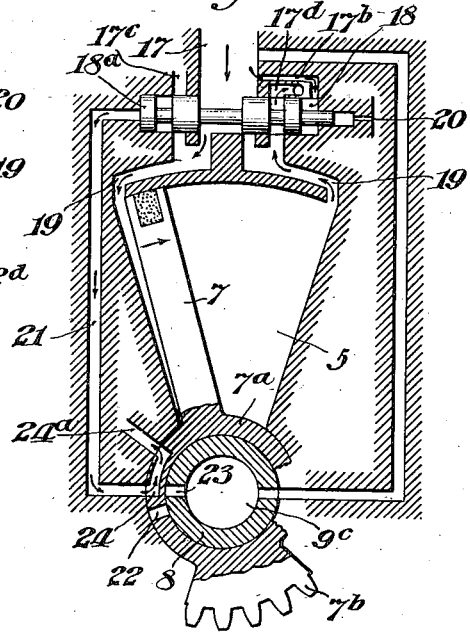
Figure 14:
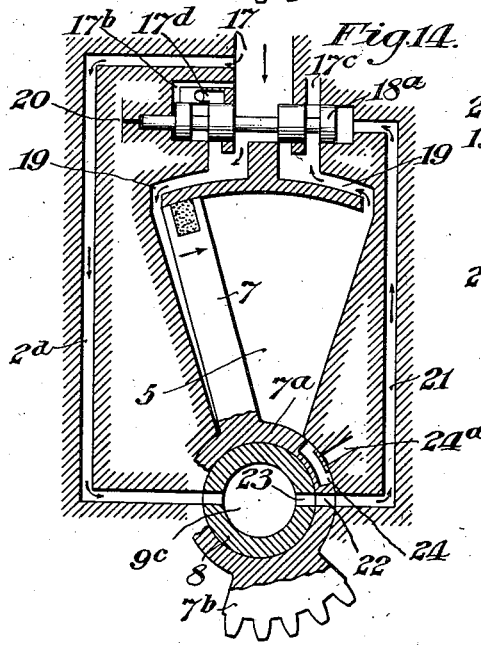
Figure 15:
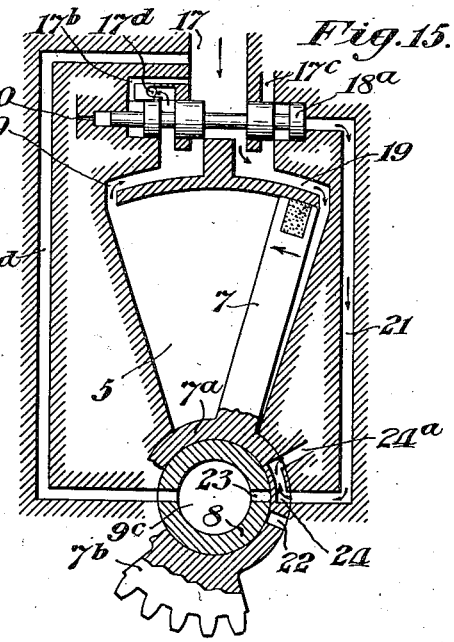

In the drawings, Figure 1 is a side elevation of a machine embodying my invention, Fig. 2 is a top elevation of the same, Fig. 3 is a sectional view on the line 3—3 of Fig. 2, Fig. 4 is a sectional view on the line 4—4 of Fig. 3, Fig. 5 is a sectional view on the line 5—5 of Fig. 3, Fig. 6 is a sectional view on the line 6—6 of Fig. 3, Fig. 7 is a sectional view on the line 7—7 of Fig. 3, Fig. 8 is a sectional view on the line 8—8 of Fig. 3, Fig. 9 is a partly sectional perspective view of a detached piston comprised in the mechanism, Fig. 10 is an enlarged perspective view of a detached housing member comprised in the mechanism, Fig. 11 is an enlarged perspective view of a further detached housing element, Figs. 12 and 13 are diagrammatic views illustrating one of the oscillating pistons together with its valve mechanisms at the two limits of their strokes, and Figs. 14 and 15 are diagrammatic views representing the other oscillating piston together with its valve mechanisms at the two limits of their strokes at the time the complementary piston and its valve mechanisms are in the respective positions shown in Figs. 12 and 13.

The machine, as illustrated in the drawings, comprises the housing members 1, 2 and 3 which are connected together by the bolts or screws 4. The members or plates 3 coact with the parts 1 and 2 to provide the parallel piston chambers 5 having the diverging sides $1^a$ radial to the cylindrical bearings $1^b$, the sides $2^a$ and $4^a$ at right angles to the diverging sides, and the cylindrical ends $2^b$ concentric with the cylindrical bearings, cylindrical recesses 6 in the member 2 extending inwardly from the chambers 5. Piston blades 7, fixed in normal relation to their hollow journals or cylindrical bearings $7^a$, are adapted to oscillate in the chambers 5 by journaling these bearings in the bearings $1^b$, $2^c$ and 6 and on the hollow cylindrical bearing 8. The bearing 8 passes through the cylindrical bearing $2^c$ of the member 2 and the cylindrical bearings $3^b$ of the plates 3, to which it is engaged by the nuts $8^a$ and the keys $8^b$. Disks 9, connected by a shank $9^a$, provide a spool which is fixed within the hollow bearing 8 to divide it into non-communicating chambers $9^b$ and $9^c$. The bearings are conveniently lubricated, while the machine is made lighter, by forming the chamber $2^f$ in the part 2, to which oil can be introduced through the aperture $2^g$ closed by the plug $2^h$, oil feeding through apertures $2^i$ and $6^a$ to the bearings. Segmental gears $7^b$ are fixed to the respective journals $7^a$ and engage segmental gears 10 which are fixed to rings $10^a$ having the internal ratchet teeth $10^b$, these rings being journaled in the bearings $1^a$ of the part 1, and the segments 10 having the bearings $10^c$ which engage the bearings $1^c$ of the part 1. Beveled segmental gears $10^d$ are fixed within the segments 10 and engage a beveled gear 11 which is journaled on an arbor 2$^e$ fixed to the bottom of the part 2.

A chuck 12, for holding a tool, is journaled in the bearing 1$^d$ of the part 1 and on the bearing 13$^a$ of the nut 13 which is screwed into the part 1 concentrically with the bearing 1$^d$, the chuck having a ring 12$^a$ on the inner end thereof by which it is connected through the ball bearings 14 with the nut 13. Pawls 15 are pivotally connected to the chuck 12 so as to oscillate in the recesses 12$^b$ thereof and clutch the respective sets of ratchet teeth 10$^b$, the pawls being thrown outwardly by the springs 15$^a$. A feed screw 16 is provided with a threaded shank 16$^a$, which engages the female thread 13$^b$ of the nut 13, and the pivotal point 16$^b$ for engaging a bearing, whereby the machine can be moved toward the work by turning the screw.

It will be understood that the oscillation of the pistons 7 (having the cylindrical bearings 7$^a$ journaled between the respective outer cylindrical bearings 1$^b$, 2$^c$ and 6 and the inner bearings 8, to provide firm supporting means and closely fitting joints) oscillates the segments 7$^b$, which in turn oscillate the segments 10 and the rings 10$^a$, whereby the ratchet teeth 10$^b$ are caused to act through the pawls 15 to revolve the chuck 12. As the segments 10 are connected by the teeth 10$^d$ through the beveled gear 11, the pistons 7 are coupled to act in opposite directions in complementary relation. Consequently, when one set of ratchet teeth 10$^b$ is acting against the corresponding pawls 15 the other set of teeth 10$^b$ is moving in the reverse direction past their pawls 15, the pawls and ratchet teeth corresponding to the respective pistons clutching alternately to rotate the chuck.

The pistons 7 are operated by an elastic fluid admitted through the inlet 17 and the passages 17$^a$ to the respective valve cylinders 18, and thence, under control of the piston valves 18$^a$, by the passages 19 to the respective chambers 5 on opposite sides of the respective pistons. Each valve cylinder has a vent 20 leading from one end thereof, a passage 17$^b$ constantly connecting the inlet 17 with the same end of the cylinder, and a passage 21 connected with the other end thereof, exhaust ports 17$^c$ and 17$^d$ being connected with the cylinder so as to communicate therethrough with the respective passages 19 under control of the valve 18$^a$. Each piston journal 7$^a$ has a passage 22 adapted for connecting the corresponding passage 21 with the passage 23 extending through the cylindrical bearing 8 to the chamber 9$^c$ which communicates through the passage 2$^d$ with the inlet 17. Each piston journal 7$^a$ has the further passage 24 adapted for connecting the corresponding passage 21 with the passage 24$^a$ through the bearing 8 to the chamber 9$^b$ and thence through the passage 24$^b$ to the atmosphere. When the complementary parts are in the positions shown in Figs. 12 and 14, the motive fluid from the inlet 17 acts through the connected passages 2$^d$, 23, 22, and 21 upon the valve 18$^a$ which is moved (because its area subject to pressure from the passage 21 is larger than its area subject to pressure from its passage 17$^b$), to open the right passage 19 of Fig. 12 and the left hand passage 19 of Fig. 14 so that the respective pistons 7 are moved in the opposite directions indicated by the arrows thereon, the chambers 5 exhausting in front of the pistons through the passages 17$^c$ communicating therewith in the present position of the valve. When the pistons 7 reach the position shown in Figs. 13 and 15, the valve chambers 18 are opened to the atmosphere through the now communicating passages 21, 24 and 24$^a$, and the motive fluid acting through the passages 17$^b$ shifts the valves 18$^a$ to the position shown. The motive fluid now acts through the left passage 19 of Fig. 13 and the right passages 19 of Fig. 15 to drive the pistons 7 simultaneously in the opposite directions indicated by the arrows thereon, the chambers 5 exhausting ahead of the pistons through the now connected right passage 19 and exhaust port 17$^d$ of Fig. 13 and the left passage 19 and exhaust port 17$^d$ of Fig. 15. The valves are timed to act so that motive fluid shall cushion the pistons 7 as they approach the limits of their stroke. The simultaneous actions of the complementary parts in opposite directions effects a balance which neutralizes vibratory tendencies in addition to multiplying the speed of rotation of the tool relative to the rate of oscillation of the driving mechanism.

While I have explained the principle of my invention and the best mode in which I contemplate applying the same, it is to be understood that changes may be made, departing from the special construction illustrated and described, within the scope of the following claims particularly pointing out my improvements.

Having described my invention, I claim:

1. The combination of a housing containing a piston chamber, having sides and a bearing from which said sides diverge, a piston blade in said chamber and a bearing therefor journaled relatively to said first bearing, valve mechanism comprised in bearings aforesaid and passages for controlling a fluid whereby said piston is oscillated, a rotary tool holder, and means whereby said piston rotates said tool holder.

2. The combination of a housing and oscillatable pistons therein, passages and valve mechanism for controlling a fluid therein whereby said pistons are caused to act simultaneously in opposite directions, a rotary device and means whereby said pistons rotate said device.

3. The combination of a housing containing piston chambers, journaled pistons adapted to oscillate therein, passages and valve mechanism for controlling a fluid therein whereby said pistons are caused to act simultaneously in opposite directions, a rotary tool holder, and means whereby said pistons rotate said tool holder.

4. The combination of a housing containing a chamber and a bearing, a bearing supported by said housing concentric to said bearing first named, means comprising a piston fulcrumed by said bearings so as to oscillate in said chamber and a member oscillated by said piston, a rotary device, and means comprising a member connected with and oscillated by said member first named whereby said device is rotated.

5. The combination of a housing containing a piston chamber and a cylindrical bearing; a piston having a journal engaging said bearing and a blade adapted to oscillate in said chamber, a member fixed to said journal opposite to said blade, oscillatable mechanism comprising a member engaged to and operated by said member first named, a rotary device, and means whereby said mechanism revolves said rotary device.

6. The combination of a housing containing a piston chamber and a bearing, lever mechanism fulcrumed by said bearing, said mechanism comprising a piston in said chamber and an oppositely extending member oscillated thereby, an oscillating member connected with and rocked by said member first named, a rotary device, and clutching mechanism whereby the second named member turns said rotary device.

7. The combination of a housing containing piston chambers and cylindrical bearings having a common axis, pistons oscillatable in said chambers, said pistons having cylindrical bearings fulcrumed by said bearings first named, valve mechanism and passages for controlling a fluid whereby said pistons are simultaneously oscillated in opposite directions, members fixed to the respective second named bearings and oscillated by said pistons, oscillatable mechanisms comprising members engaged to and oscillated by said members first named, a rotary member and clutching mechanisms whereby said oscillatable mechanisms alternately actuate said rotary member.

8. The combination of a fixed housing containing concentric bearings, a piston chamber, and an oscillating piston in said chamber, said piston having a cylindrical bearing engaged externally and internally by said concentric bearings.

9. The combination of a housing containing chambers, bearings for oscillating pistons, pistons having bearings engaging said bearings first named and blades in the respective chambers, a valve chamber, a fluid actuated valve movable in said valve chamber, and passages connected with said valve chamber whereby an actuating fluid is admitted to said chambers first named under control of said valve so as to oscillate said pistons simultaneously in opposite directions.

10. The combination of piston chambers, bearing means, pistons having bearing means engaged by said bearing means first named and blades in said chambers respectively, passages connected with said chambers on opposite sides of the respective blades, and fluid operated valve mechanism connected with said passages and adapted for controlling motive fluid so as to oscillate pistons aforesaid simultaneously in opposite directions.

11. The combination of a housing containing a piston chamber, concentric cylindrical bearings containing fluid passages, a piston having a cylindrical bearing supported by said concentric bearings and containing passages adapted for communicating with passages aforesaid, said piston having a blade in said chamber, a valve chamber connected with passages aforesaid, a valve in said chamber movable by fluid pressure acting through passages aforesaid under control of said piston, and passages connected with said valve chamber whereby fluid pressure is communicated to said piston chamber alternately on opposite sides of said blade under control of said valve.

12. The combination of a housing containing a cylinder, a piston valve in said cylinder, a fluid inlet communicating with said cylinder, a piston chamber, an oscillating piston having a blade in said chamber, passages controlled by said valve and adapted for connecting said cylinder with said chamber on opposite sides of said blade, and passages, controlled by said oscillating piston, for connecting said cylinder with said inlet and operating said valve.

13. The combination of a housing containing a cylinder, a piston valve in said cylinder, a fluid inlet communicating with said cylinder, a piston chamber, an oscillating piston having a blade in said chamber, passages controlled by said valve and adapted for connecting said cylinder with said chamber on opposite sides of said blade, and passages controlled by said oscillating piston whereby fluid is alternately admitted to and discharged from said cylinder.

14. The combination of a housing having a fluid inlet, a cylinder connected therewith, a piston valve in said cylinder, a by-pass connecting said inlet with an end of said cylinder to effect the movement of said piston in one direction, a piston chamber, an oscillating piston having a blade in said chamber, passages controlled by said valve for connecting said cylinder with said chamber on opposite sides of said blade to effect the movement of said piston, and passages controlled by said piston for connecting the other end of said cylinder alternately with said inlet and the atmosphere.

15. The combination of a pair of oscillating pistons provided with segmental gears, a pair of oscillating members provided with segmental gears engaging said segmental gears first named, a pinion, said members having teeth engaging said pinion, a rotary device, and means whereby said members alternately actuate said rotary device.

16. The combination of a housing containing a piston chamber, a fulcrumed lever comprising a blade adapted to oscillate in said chamber and an oppositely disposed toothed segment adapted to be oscillated thereby, oscillatable mechanism comprising a toothed segment engaged and oscillated by said segment first named, a rotary device, and means whereby said mechanism rotates said device.

17. The combination of a housing containing piston chambers, fulcrumed levers comprising blades adapted to oscillate in the respective chambers and toothed segments adapted to be oscillated by the respective blades, means for controlling fluid pressure whereby said blades are simultaneously moved in opposite directions, mechanisms comprising toothed segments engaged and oscillated by the respective toothed segments first named, a rotary device, and means whereby said mechanisms rotate said device.

18. The combination of a housing containing a piston chamber and cylindrical bearing means, a piston in said chamber, said piston having a hollow cylindrical bearing engaged within said bearing means, and a cylindrical bearing supported by said housing within said hollow cylindrical bearing.

19. The combination of a housing containing a piston chamber and separated cylindrical bearings, a piston having a blade within said chamber and cylindrical bearings engaged within said bearings first named, said piston having an inner cylindrical bearing concentric with the bearings aforesaid, and a cylindrical bearing supported by said housing within said inner cylindrical bearing, bearings aforesaid containing passages controlled by said piston.

20. The combination of a housing having piston chambers, cylindrical bearings and detachable cover plates for said chambers, with cylindrical bearing means supported by said housing concentrically to said bearings, and pistons having blades in said chambers and hollow cylindrical journals engaged exteriorly by said bearings and interiorly by said means.

In witness whereof I have hereunto set my name this 12th day of November, 1912, in the presence of the subscribing witnesses.

CHARLES H. HAESELER.

Witnesses:
  Jos. G. Denny, Jr.,
  Geo. A. Cunney.